United States Patent [19]

Krayenbuhl et al.

[11] 4,150,540
[45] Apr. 24, 1979

[54] ROCKET NOZZLE SYSTEM

[75] Inventors: Harold A. Krayenbuhl, Fair Oaks; Gene Dolgonas, Carmichael; Charles J. Rogers, Placerville, all of Calif.

[73] Assignee: The United States of America as represented by the Secretary of the Air Force, Washington, D.C.

[21] Appl. No.: 787,676

[22] Filed: Apr. 14, 1977

[51] Int. Cl.² .................................... F02K 9/04
[52] U.S. Cl. ........................ 60/271; 60/200 A; 60/263; 239/265.15
[58] Field of Search .............. 60/200 A, 271, 253; 239/265.11, 265.15

[56] References Cited

U.S. PATENT DOCUMENTS

| 3,048,970 | 8/1962 | Herzog | 60/200 A |
|---|---|---|---|
| 3,052,090 | 9/1962 | Herzog | 60/200 A |
| 3,133,411 | 5/1964 | McCorkle | 60/200 A |
| 3,156,091 | 11/1964 | Kraus | 60/200 A |
| 3,285,519 | 11/1966 | McKague | 239/265.15 |
| 3,372,548 | 3/1968 | Mathis et al. | 60/271 |
| 3,606,164 | 9/1971 | Stokes et al. | 239/265.15 |
| 3,694,883 | 10/1972 | Olcott | 60/200 A |
| 3,771,726 | 11/1973 | Mikeska | 239/265.11 |

OTHER PUBLICATIONS

"Mark's Handbook", 7th Edit., 1967, McGraw-Hill; pp. 6-182, 6-205.
"Rubber Technology", 2nd Edit., 1973, Van Nostrand; pp. 368, 369, 381.

Primary Examiner—Robert E. Garrett
Attorney, Agent, or Firm—Joseph E. Rusz; Jacob N. Erlich

[57] ABSTRACT

An improved rocket nozzle system having a closure insulator located adjacent the combustion chamber of a rocket engine. The closure insulator has formed as an integral part thereof a plurality of nozzles. Each of the nozzles has incorporated therein a throat insert of pyrolized graphite cloth laminate and a consumable washer. The entire closure insulator assembly including nozzles is transfer molded as one piece into a steel housing. The housing is mounted on the combustion chamber thereby providing an effective nozzle system which is reliably operable under high temperature operation.

2 Claims, 2 Drawing Figures

U.S. Patent    Apr. 24, 1979    4,150,540

ROCKET NOZZLE SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to solid propellant rocket engines, and, more particularly, to an improved rocket nozzle system for use therewith.

Rocket engines are generally classified as either liquid propellant engines, solid propellant engines or hybrid engines (i.e., a combination of liquid and solid propellants). Although the instant invention is capable of incorporation within any of the above-mentioned types of rocket engines, its main utility has been found in the solid propellant rocket engine. Therefore, a brief analysis of the solid propellant rocket engine is set forth hereinbelow.

In a solid propellant rocket engine the propellant is contained in solid form within the combustion chamber. In addition to the combustion chamber, the other basic elements of the solid propellant engine, as in other rocket engines, are the nozzle and igniter. The solid propellants usually have a cake-like appearance (grain) and burn on their exposed surfaces to form hot exhaust gases that exhaust through the nozzle.

The solid-propellant grain contains all material necessary for sustaining combustion. It can be a mixture of several chemicals, for example, a mixture of ammonium perchlorate in a matrix of organic fuel such as rubber, or it can be a homogeneous charge of special oxidizing organic chemicals, such as nitrocellulose or nitroglycerine. Once the propellant is ignited, the grain burns smoothly on its exposed surface in a direction normal to the burning surface.

The chamber confines the propellant grain and the reaction products of combustion. It is generally made of high-strength material, such as alloy steel or fiber-reinforced plastics, and is often protected on its exposed surfaces from excessive heating by internal insulating layers made of either a slow-burning rubbery or plastic liner, or sometimes a ceramic insulator. This liner, which is a thin layer next to the wall of the case, serves not only as a thermal insulator but also as a means for obtaining good adhesion or bonding of the grain to the case.

Combustion chambers are usually cylindrical in shape, with elliptical or spherical ends. Diaphragms, blowout closures, or other safety provisions have been used to prevent overpressurization of the chamber. In some designs the burst diaphragms are intentionally activated to stop the application of thrust at a predetermined time. If the grain is not case-bonded, the chamber ordinarily has means for holding the grain in place and positioning it, so that the acceleration of the vehicle will not force it into the nozzle. In these designs one end of the chamber is usually detachable to permit loading of the grain. In case-bonded grains the assembly opening is usually smaller than the maximum diameter of the unit, just large enough to permit the insertion and subsequent withdrawl of the mandrel. In addition, the chamber usually has provisions for mounting to the vehicle, and for sealing against moisture, which would cause deterioration of certain grain chemicals.

The most severe heating of the hardware takes place at the exhaust nozzle. Here high-velocity gas at high-combustion temperature oxidizes, softens, wears, and erodes the nozzle material. If the nozzle throat is eroded unsymmetrically, then the thrust vector direction may shift and cause the flight to become erratic. For this reason it if often desirable to put special heat-resistant ceramic or graphite inserts into the nozzle throat region to minimize unsymmetrical enlargement of the nozzle area. Ceramic nozzles have been successful for long periods of time: however, their effectiveness for high-temperature propellants seems to be limited to approximately 2 min. It is therefore essential for optimum solid propellant rocket engine operation to provide a rocket nozzle which is capable of effective economical and reliable high temperature operation.

SUMMARY OF THE INVENTION

The instant invention provides an improved rocket engine nozzle system which substantially alleviates the problems set forth hereinabove encountered with nozzles of the past.

The rocket nozzle system of this invention, although primarily designed for use with solid propellant rocket engines, finds utility in any type of rocket engine which operates under high temperatures. The nozzle system of the instant invention is basically made up of a mild-steel aft-closure shell and an aft-closure insulator forming a plurality of nozzles. Generally, optimum rocket engine operation with this invention utilizes four nozzles formed within the insulator.

The nozzle system of the instant invention more specifically includes four Carb-I-Tex-700 throat inserts with consumable Nylon paper expansion washers within four molded carbon/phenolic (MXC-313) cones or nozzles, and four mild-steel exit cone sleeves. The aft-closure insulator including the four exit cones are transfer molded as one piece into the steel aft-closure shell with the throat inserts, washers, and exit cone sleeves in place. Such a technique of integrally molding all aft-closure/nozzle components into a single piece in one operation enhances reliability and reproducibility at a substantial cost savings over conventional methods of fabrication and assembly.

It is therefore an object of this invention to provide a rocket engine nozzle system which achieves required structural and thermal capabilities during high temperature operation.

It is another object of this invention to provide a rocket engine nozzle system which performs reliably under the extreme temperature requirements of solid propellant rocket engines.

It is still another object of this invention to provide a rocket engine nozzle system which is economical to produce and which utilizes conventional, currently available components that lend themselves to standard mass producing manufacturing techniques.

For a better understanding of the present invention together with further objects thereof reference is now made to the following description taken in conjunction with the accompanying drawing and its scope will be pointed out in the appended claims.

DETAILED DESCRIPTION OF THE PREFERRED EMBODIMENT

Figure 1:
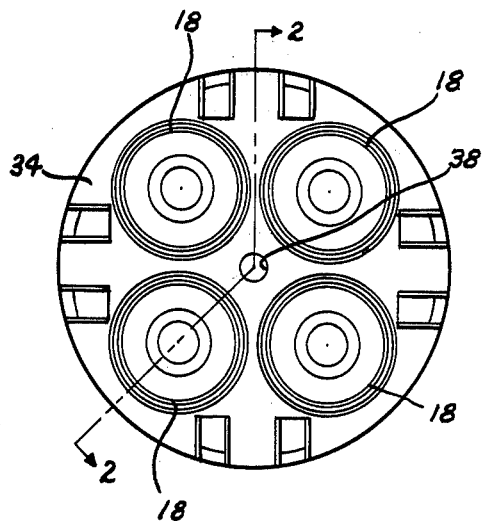
FIG. 1 is an end view of the rocket engine nozzle system of this invention.
Figure 2:
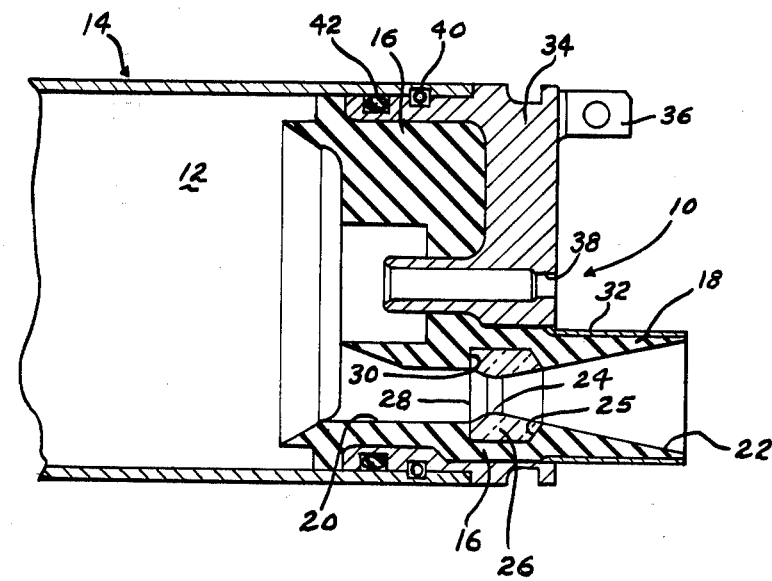
FIG. 2 is a side elevational view of the rocket engine nozzle system of this invention taken along lines 2—2 of FIG. 1.

Reference is now made to FIGS. 1 and 2 of the drawing which show the rocket nozzle system 10 of this invention mounted upon the combustion chamber 12 of any conventional rocket engine 14. Although any conventional rocket engine may be utilized with the instant invention, optimum results and efficiency are obtained from the utilization of nozzle system 10 with a solid propellant rocket engine 14.

Located adjacent combustion chamber 12 and forming a major part of the nozzle system 10 of this invention is an aft-closure insulator 16. Aft-closure insulator 16 also contains molded therein the nozzles or exit cones 18. Although any number of nozzles may be formed within insulator 16, four such nozzles 18 provide extremely reliable rocket engine operation. The entire aft-closure and exit cone combination 16 is made of any suitable insulating and low-erosive material such as MXC-313 manufactured by the Fiberite Corporation of Winona, Minnesota. This material is an ablative carbon fiber/phenolic that has adequate insulating and erosive properties, as well as the physical properties required for satisfactory transfer molding at high production rates. In addition, this material is capable of withstanding the stringent erosive conditions of the four-nozzle configuration of the instant invention, while providing satisfactory thermal protection.

The configurations of the entrance and exit sections 20 and 22, respectively, or each nozzle 18 are molded into the aft-closure insulator 16. The entrance sections 20 are specifically designed to promote smooth entry of the gases into each throat 24, thus providing minimum insulator erosion and maximum engine performance. Each throat 24 of nozzles 18 contain within an indentation 25 therein an insert 26 of Carb-I-Tex 700, manufactured by the Carborundem Co. of Pittsburgh, Pa. Throat inserts 26 are cylindrical on the outer diameter with a conical aft end. They have a cylindrical throat diameter of approximately 0.271 in., extending a nominal axial length of 0.10 in. The cylindrical shape best provides ease of manufacture, dimensional control, and minimum throat erosion. Each insert 26 has a consumable Nylon washer 28 at the fore end 30 to permit longitudinal thermal expansion during firing, thereby relieving stresses and preventing insert cracking and possible ejection.

The four throat inserts 26 are equally spaced on a 0.760-in. radius around the closure center line. This placement is the maximum radial position compatible with proper operation of the rocket engine 14. The exit cones or nozzles 18 have a 11.5° half angle and an expansion ratio of 8.6. Their exit diameter (0.797 in.) is limited by the motor envelope and the requirement for sufficient wall thickness to withstand erosion.

The material selected for the throat inserts 26, Carb-I-Tex 700, is a pyrolized graphite cloth laminate. This material has a high compressive strength of 21,000 psi across the laminate grain, the plane in which the highest stresses are predicted during firing. In addition, it can readily withstand the 7000 psi molding pressure. The material has a tensile strength of 7600 psi with the laminate grain and 500 psi across the laminate grain. The incorporation of this material within the nozzle system 10 of this invention not only provides high strength and inherent toughness but also eliminates the cracking which is likely to occur in molded pieces.

Washers 28 are made of any suitable material such as Nomex 410 Nylon paper (approximately 0.02 in. thick) manufactured by the Dupont Corporation of Wilmington, Delaware. This washer 28 is consumed at 700° F. to provide a suitable gap for longitudinal thermal expansion of throat insert 26 during firing. The material has the required properties to withstand the molding temperature of 320° F. and the molding pressure of 7000 psi which results in a maximum reduction in thickness of 0.003 in. Nomex 410 is a combination of two forms of a long chain synthetic polymer, fibrous binder particles and short length (¼-in.) fibers. After processing on conventional papermaking equipment, the fibrids and short length fibers are permanently bonded to each other by a hot calendering operation.

An exit cone sleeve 32 made of any suitable material such as mild-steel surrounds each nozzle or exit cone 18. The aft-closure insulator 16 with its four exit cones or nozzle 18 are transfer molded as one piece into an aft-closure shell 34, with the throat inserts 26, washers 28, and exit cone sleeves 32 in place. The selected material for the aft-closure shell 34 is free-machining, low-carbon, cold-drawn steel bar stock, 1117. The steel has more than adequate mechanical properties for use within the instant invention because of its adequate strength, machinability, and low cost in high rate production. Shell 34 is cadmium plated to provide the corrosion resistance required for the expected environmental conditions. All finished surfaces are machined in keeping with the intended function and cost effectiveness. In addition, all mating surfaces have sufficient tolerance for required fits, while permitting low-cost machining techniques and minimum inspection.

In addition, provisions are made on aft-closure shell 34 for the mounting of a fin assembly on extension 36 and an igniter assembly within an opening 38. The entire aft-closure assembly which includes aft-closure shell 34 and aft-closure insulator 16 is attached to combustion chamber 12 by means of any suitable attaching means, such as a submerged lockwire 40. The aft-closure shell 34 is sealed to chamber 12 by a conventional O-ring 40 and any suitable insulation 42. In addition, the insulation provides protection to the joint and the aft-closure insulator 16 from the erosive effects of gas flow throughout the firing duration.

The integrally molded aft closure insulator 16 of MXC-313 maintains shell structural integrity as evidenced by the elimination of hot spots. During firings, insulator 16 has shown an average erosion rate of 16 mils/sec and an average char depth of 0.120 in. immediately forward of throat insert 26. A heat transfer analysis shows that insulator 16 keeps the temperature of aft-closure shell 34 well within the required 300° F. for adequate material strength.

Furthermore, since the Carb-I-Tex 700 throat inserts 26 have high compressive strengths, inserts 26 are readily acceptable for use within the integrally molded aft-closure design as set forth hereinabove.

Although this invention has been described with reference to a particular embodiment it will be understood to those skilled in the art that this invention is also capable of a variety of alternate embodiments within the spirit and scope of the appended claims.

We claim:

1. A rocket nozzle system comprising a supporting structure, said supporting structure having at least one nozzle formed as an integral part thereof, said nozzle having an entrance section and an exit section, a throat located intermediate said entrance and exit sections of said nozzle, a throat insert formed of a pyrolized graphite cloth laminate secured within said throat section of said nozzle, a washer of predetermined thickness being located between said throat insert and said entrance section of said nozzle, said washer being consumable at temperatures greater than approximately 700° F. and yet capable of withstanding a temperature of approximately 320° F. and a pressure of approximately 7000 psi with a resultant maximum reduction of said predetermined thickness of approximately 15 percent and a steel housing encompassing said supporting structure, said supporting structure being transfer molded as one piece into said steel housing.

2. A rocket nozzle system as defined in claim 1 wherein said washer is made of the combination of two forms of a long chain synthetic polymer, fibrous binder particles and short length fibers.

* * * * *